(12) United States Patent
Croteau et al.

(10) Patent No.: US 9,268,617 B1
(45) Date of Patent: Feb. 23, 2016

(54) BUS-BASED DYNAMIC EVALUATION WITH DYNAMIC DATA LOOKUPS

(71) Applicant: CA, Inc., Islandia, NY (US)

(72) Inventors: Beau Croteau, Bay Shore, NY (US); Robert Hucik, Simi Valley, CA (US)

(73) Assignee: CA, Inc., New York, NY (US)

( * ) Notice: Subject to any disclaimer, the term of this patent is extended or adjusted under 35 U.S.C. 154(b) by 0 days.

(21) Appl. No.: 13/793,398

(22) Filed: Mar. 11, 2013

(51) Int. Cl.
*G06F 3/00* (2006.01)
*G06F 9/44* (2006.01)
*G06F 9/46* (2006.01)
*G06F 13/00* (2006.01)
*G06F 9/54* (2006.01)

(52) U.S. Cl.
CPC .................................. *G06F 9/54* (2013.01)

(58) Field of Classification Search
None
See application file for complete search history.

(56) References Cited

U.S. PATENT DOCUMENTS

| 5,488,723 | A * | 1/1996 | Baradel et al. | 719/315 |
| 6,587,899 | B1 * | 7/2003 | Jarvi et al. | 710/33 |
| 6,789,257 | B1 * | 9/2004 | MacPhail | 719/316 |
| 7,707,584 | B2 * | 4/2010 | Driesner et al. | 719/313 |
| 2008/0072241 | A1 * | 3/2008 | Cohen et al. | 719/317 |
| 2012/0210335 | A1 * | 8/2012 | Salt et al. | 719/315 |

* cited by examiner

*Primary Examiner* — Taun Dao
*Assistant Examiner* — William C Wood
(74) *Attorney, Agent, or Firm* — Myers Bigel & Sibley, P.A.

(57) ABSTRACT

Provided are methods of providing dynamic messages on a software bus. Such methods may include generating a dynamic message that corresponds to a service request from an application that is connected to a software bus. The dynamic message includes an executable portion that is executed to perform an action. The dynamic message is submitted to the bus for execution at a time after submission.

22 Claims, 6 Drawing Sheets

BUS-BASED DYNAMIC EVALUATION WITH DYNAMIC DATA LOOKUPS

BACKGROUND

Middleware may refer to a family of computer software that permits the interconnection, usually over a network, of disparate software components or applications possibly running across heterogeneous computing platforms. Middleware may be used to support complex distributed applications including web servers, application servers, content management systems, and more generally to support software products and tools that may be part of an information technology (IT) system. Use of such middleware may also be used to link new applications to older legacy systems. For example, service oriented architecture may use a service bus, which may be referred to as an enterprise service bus (ESB), which is a distributed software architecture implemented from a collection of middleware services to provide integration capabilities.

An ESB may create a virtual environment layered on top of an enterprise messaging system where services are advertised and accessed. A message bus or service bus may deliver foundational services for more complex architectures via an event-driven and messaging middleware. In this regard, an ESB may be a message transaction system that is a logical channel that carries messages that can be viewed by multiple recipients. For example the service ticket may be created and the corresponding data may be put on a message bus that can be processed by one or more systems depending on their interest in that particular ticket. Any system that has interest in the ticket may read the information from the message bus.

A service bus may be a logical concept that allows applications to be connected. In this regard, a service bus may allow the decoupling of data from the services acting on the data. Service buses may be used to pass events from one service to one or more other services. However, such events may be static in nature, containing a point in time snapshot of whatever data is contained therein.

BRIEF SUMMARY

It is noted that aspects described with respect to one embodiment may be incorporated in different embodiments although not specifically described relative thereto. That is, all embodiments and/or features of any embodiments can be combined in any way and/or combination. Moreover, other systems, methods, and/or computer program products according to embodiments will be or become apparent to one with skill in the art upon review of the following drawings and detailed description. It is intended that all such additional systems, methods, and/or computer program products be included within this description, be within the scope of the present invention, and be protected by the accompanying claims.

Methods according to some embodiments herein include generating a dynamic message that corresponds to a service request from an application that is connected to a software bus, the dynamic message comprising an executable portion that is executed to perform an action. Some embodiments may include submitting the dynamic message to the software bus. The executable portion may be executed by the application and perform the action substantially after the dynamic message is submitted to the software bus.

In some embodiments, the application includes a first application that causes the executable portion to be executed by a second application that is different from the first application. Some embodiments provide that the dynamic message is submitted to the software bus at a first time, the first application accesses the dynamic message at a second time that is after the first time, and the action includes retrieving data via a second application that is different from the first application. In some embodiments, the data includes a first data value at the first time and a second data value that is different from the first data value at the second time.

Some embodiments provide that the executable portion includes a dynamic computer programming language that is compiled as human readable source code. Some embodiments provide that the dynamic message includes a first event object, the software bus includes an event bus, and the first event object is evaluated on the event bus to generate a second event object and a third event object responsive the executable portion. In some embodiments, the second event object is evaluated to cause a first notify action and the third event is evaluated to cause a second notify action that is different from the first notify action.

In some embodiments, the executable portion includes computer program code that retrieves data that is generated after the dynamic message is submitted to the software bus. Some embodiments provide that the data that is generated after the dynamic message is submitted to the bus replaces the executable portion of the dynamic message for evaluation by the application. In some embodiments, the executable portion includes computer program code that retrieves data that is generated substantially contemporaneous to when the data is retrieved.

In some embodiments, the application includes a first service and the executable portion includes dynamic computer program code that directs retrieval of data from a second service to the first service via the software bus. Some embodiments provide that the second service does not exist when the first service is connected to the software bus. In some embodiments, the application includes a first service, and the executable portion includes dynamic computer program code that includes input data for a second service that causes the second service to provide output data responsive to the input data, and that replaces the executable portion with the output data from the second service.

Embodiments herein include computer program products and systems that may be configured and/or operable to perform operations described herein.

It is noted that aspects of the disclosure described with respect to one embodiment, may be incorporated in a different embodiment although not specifically described relative thereto. That is, all embodiments and/or features of any embodiment can be combined in any way and/or combination. These and other objects and/or aspects of the present invention are explained in detail in the specification set forth below.

BRIEF DESCRIPTION OF THE DRAWINGS

Aspects of the present disclosure are illustrated by way of example and are not limited by the accompanying figures with like references indicating like elements.

DETAILED DESCRIPTION

Figure 1:
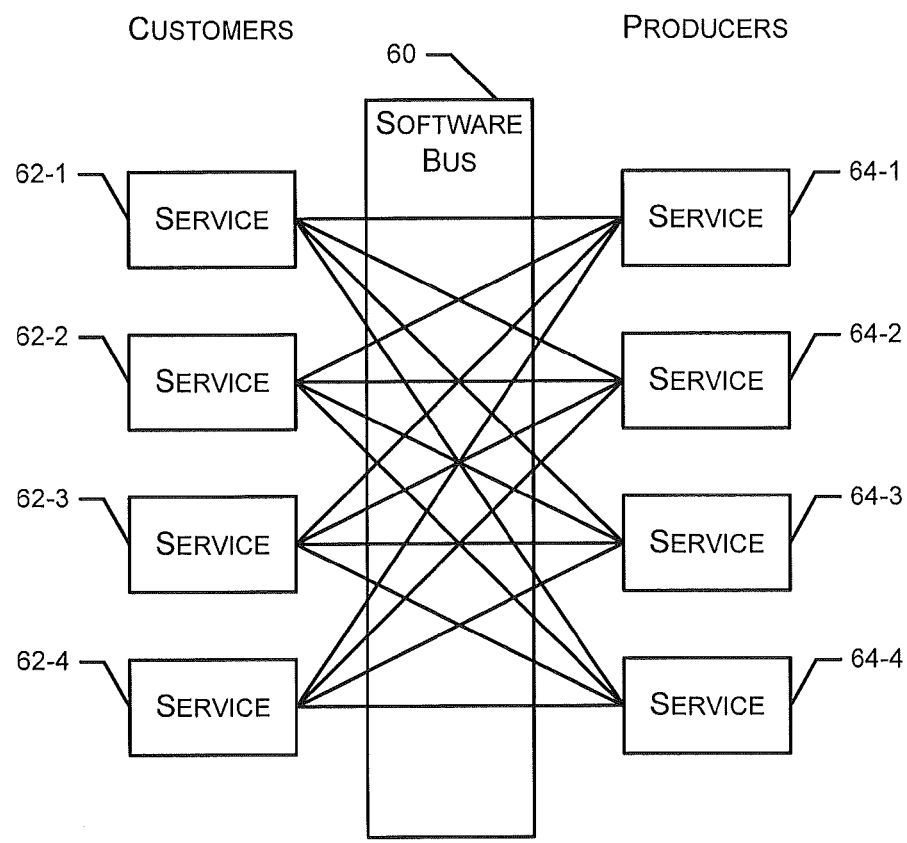
FIG. 1 is a block diagram of a software bus that may be used according to some embodiments of the present inventive subject matter.

As will be appreciated by one skilled in the art, aspects of the present disclosure may be illustrated and described herein in any of a number of patentable classes or context including any new and useful process, machine, manufacture, or composition of matter, or any new and useful improvement thereof. Accordingly, aspects of the present disclosure may be implemented entirely hardware, entirely software (including firmware, resident software, micro-code, etc.) or combining software and hardware implementation that may all generally be referred to herein as a "circuit," "module," "component," or "system." Furthermore, aspects of the present disclosure may take the form of a computer program product embodied in one or more computer readable media having computer readable program code embodied thereon.

Any combination of one or more computer readable media may be utilized. The computer readable media may be a computer readable signal medium or a computer readable storage medium. A computer readable storage medium may be, for example, but not limited to, an electronic, magnetic, optical, electromagnetic, or semiconductor system, apparatus, or device, or any suitable combination of the foregoing. More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), an appropriate optical fiber with a repeater, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable signal medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Scala, Smalltalk, Eiffel, JADE, Emerald, C++, C#, VB.NET, Python or the like, conventional procedural programming languages, such as the "C" programming language, Visual Basic, Fortran 2003, Perl, COBOL 2002, PHP, ABAP, dynamic programming languages such as Python, Ruby and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a Software as a Service (SaaS).

Aspects of the present disclosure are described herein with reference to flowchart illustrations and/or block diagrams of methods, apparatuses (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable instruction execution apparatus, create a mechanism for implementing the functions/acts specified in the flowchart and/or block diagram block or blocks.

These computer program instructions may also be stored in a computer readable medium that when executed can direct a computer, other programmable data processing apparatus, or other devices to function in a particular manner, such that the instructions when stored in the computer readable medium produce an article of manufacture including instructions which when executed, cause a computer to implement the function/act specified in the flowchart and/or block diagram block or blocks. The computer program instructions may also be loaded onto a computer, other programmable instruction execution apparatus, or other devices to cause a series of operational steps to be performed on the computer, other programmable apparatuses or other devices to produce a computer implemented process such that the instructions which execute on the computer or other programmable apparatus provide processes for implementing the functions/acts specified in the flowchart and/or block diagram block or blocks.

Reference is now made to FIG. 1, which is a block diagram of a software bus that may be used according to some embodiments of the present inventive subject matter. As provided herein, a software bus 60 may include a message bus, an event bus and/or a service bus such as enterprise service bus (ESB) that may provide a software architecture model used for designing and implementing interaction and communication between mutually interacting software applications in a service oriented architecture. In the context of the software bus 60, the different software applications may be referred to as services 62, 64. Customer services 62 may send a request that may be responded to by producer services 64. Some embodiments provide that the same type of software application may be both a customer service 62 and a producer service 64. The software bus 60 may provide agility and/or flexibility with regards to communication interaction between the services 62, 64. The software bus 60 may communicate with all customer services 62 in the same manner and translate a message received by a customer service 62 into a correct message type corresponding to the producer service 64.

A software bus 60 may assume that services 62, 64 are generally autonomous, and that the availability thereof in a given moment in time may not be guaranteed. As such, messages may be routed through the software bus for buffering or message queuing. When a software bus 60 receives a message, the message may be routed to the appropriate service 64 (application). Software buses 60 may allow a system to decouple its services from the data that is being processed, and may typically be used to pass events between services 62, 64. However, historically, software buses 60 were typically limited to static data.

Software buses 60 may be generally capable of: transforming messages from one format to another to accommodate the requirements of registered service providers; routing messages to registered services; augmenting message content with information such as additional metadata about the message requester; augmenting the message protocol to meet service provider requirements; notifying registered message listeners of specific message requests; and/or securing delivery of messages by enforcing authentication, authorization, non-repudiation, confidentiality, etc.

As provided herein, dynamic messages may be created using executable code to be embedded in the message data. In some embodiments, the executable code may be provided using a dynamic programming language, such as Scheme, Lisp or JavaScript, among others. In this manner, the embedded code can be used by the recipient service to access and process up-to-date information. For example, some embodiments provide that data which did not exist and/or correspond to events which have not occurred at the time a message is submitted to the software bus 60 may be accessed and processed by a service using the executable code.

In some embodiments, a service 62, 64 can pull a ticket with embedded code from the software bus 60, and, whenever the ticket is referenced, the service 62, 64 may dynamically look up information corresponding to the ticket using the embedded executable code. In this matter, a recipient service 62, 64 may not be limited to using static information in the message.

In addition to decoupling the data from the service 62, 64, dynamic messages as provided herein may provide dynamic evaluation of the data. For example, a message may be submitted to the software bus that instructs that an email be sent to an intended recipient corresponding to reporting one or more data items. In some embodiments, such data items may include the status of a process, such as a production build, and/or a process performance parameter, such as a network device loading value, among others. In the case of a build, for example, the build may have several options therein, the outcome of which may not be known when the email is actually sent. In this regard, when the email service actually gets around to processing the message, the email service may perform a dynamic lookup using the executable code in the message to determine the current status of the build prior to sending the email.

In addition to dynamic data, executable code in a dynamic message may be able to perform dynamic actions as well. For example, a message may request evaluation from a service that does not exist when the message is sent. When the previously non-existing service becomes available, the evaluation may be completed. More generally, the executable code in the dynamic message may provide that a first service has no capacity for performing a lookup in a second service. However, as the executable code possesses the instructions for performing such lookup, the function may be performed transparently by the first service via the second service.

Figure 2:
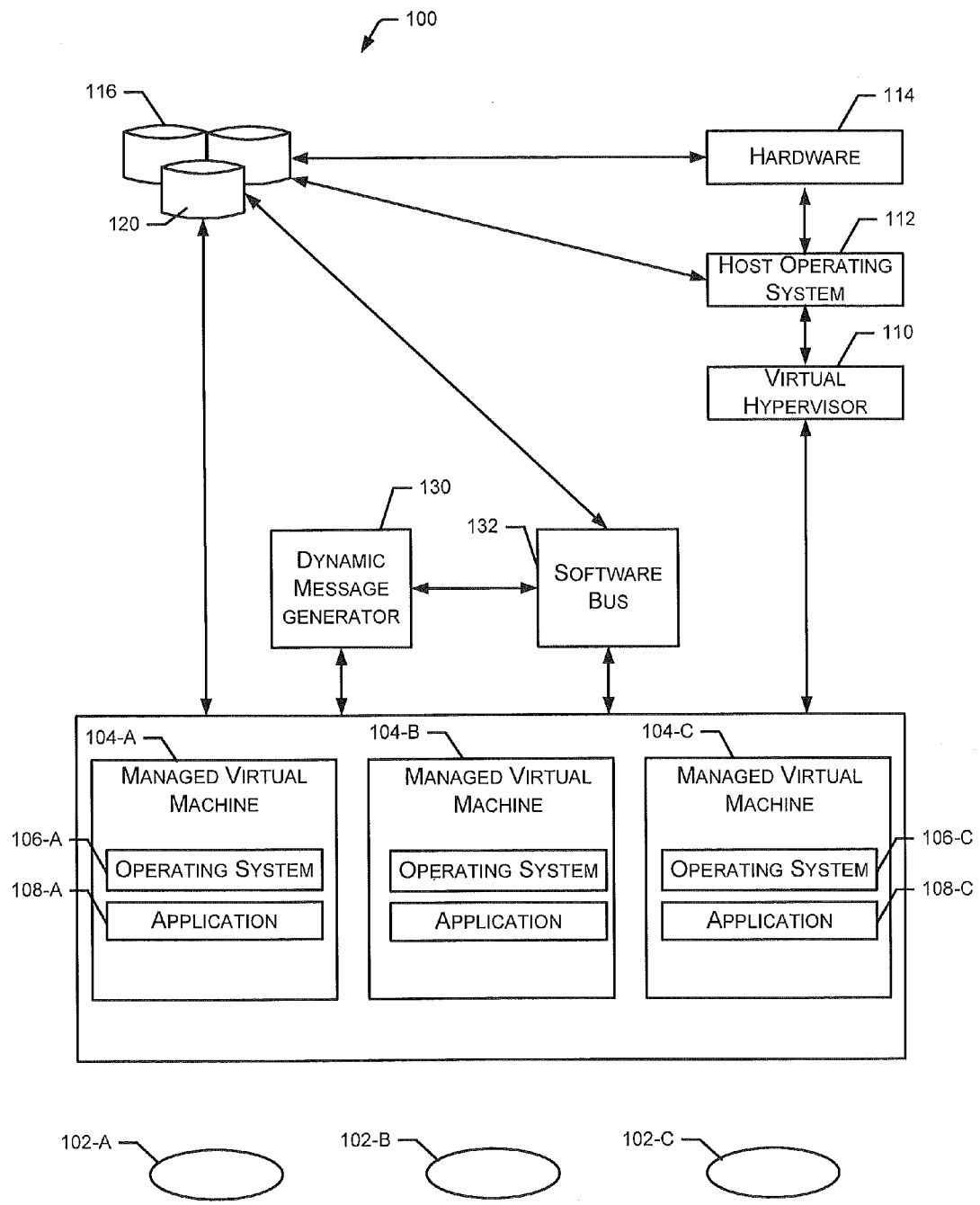
FIG. 2 is a block diagram of a computing system that supports a virtual operating environment according to some embodiments of the present inventive subject matter.

Reference is now made to FIG. 2, which is a block diagram of a computing system that supports a virtual operating environment according to some embodiments of the present inventive subject matter. The computer system 100 generally hosts and manages one or more virtual machines 104 (hereafter managed virtual machine, or managed machine), each of which runs a guest operating system 106 and application 108. The computing needs of users 102 (e.g., humans and/or other virtual/non-virtual machines) drive the functionality of the virtual machines 104. A virtual hypervisor 110 can provide an interface between the virtual machines 104 and a host operating system 112 and allow multiple guest operating systems 106 and associated applications 108 to run concurrently. The host operating system 112 handles the operations of a hardware platform 114 capable of implementing virtual machines 104. A data storage space 116 may be accessed by the host operating system 112 and is connected to the hardware platform 114.

The hardware platform 114 generally refers to any computer system capable of implementing virtual machines 104, which may include, without limitation, a mainframe computer platform, personal computer, mobile computer (e.g., tablet computer), server, wireless communication terminal (e.g., cellular data terminal), or any other appropriate program code processing hardware. The hardware platform 114 may include computer resources such as a processing circuit (s) (e.g., central processing unit, CPU); networking controllers; communication controllers; a display unit; a program and data storage device; memory controllers; input devices (such as a keyboard, a mouse, etc.) and output devices such as printers. The processing circuit(s) is configured to execute computer program code from memory device(s), described below as a computer readable storage medium, to perform at least some of the operations and methods described herein, and may be any conventional processor circuit(s), such as the AMD Athlon™ 64, or Intel® Core™ Duo.

The hardware platform 114 may be further connected to the data storage space 116 through serial and/or parallel connections. The data storage space 116 may be any suitable device capable of storing computer-readable data and program code, and it may include logic in the form of disk drives, random access memory (RAM), or read only memory (ROM), removable media, or any other suitable memory component. According to the illustrated embodiment, the host operating system 112 functionally interconnects the hardware platform 114 and the users 102 and is responsible for the management and coordination of activities and the sharing of the computer resources.

Although some embodiments of the computer system 100 can be configured to operate as a computer server, the computer system 100 is not limited thereto and can be configured to provide other functionality, such as data processing, communications routing, etc.

Besides acting as a host for computing applications that run on the hardware platform 114, the host operating system 112 may operate at the highest priority level in the system 100, executing instructions associated with the hardware platform 114, and it may have exclusive privileged access to the hardware platform 114. The priority and privileged access of hardware resources affords the host operating system 112 exclusive control over resources and instructions, and may preclude interference with the execution of different application programs or the operating system. The host operating system 112 can create an environment for implementing a virtual machine, hosting the "guest" virtual machine. One host operating system 112 is capable of implementing multiple isolated virtual machines simultaneously.

A virtual hypervisor 110 (which may also be known as a virtual machine monitor or VMM) may run on the host operating system 112 and may provide an interface between the virtual machine 104 and the hardware platform 114 through the host operating system 112. The virtual hypervisor 110 virtualizes the computer system resources and facilitates the operation of the virtual machines 104. The hypervisor 110 may provide the illusion of operating at the highest priority level to the guest operating system 106. However, the virtual hypervisor 110 can map the guest operating system's priority level to a priority level lower than the top most priority level. As a result, the virtual hypervisor 110 can intercept the guest operating system 106, and execute instructions that require virtualization assistance. Alternatively, the virtual hypervisor 110 may emulate or actually execute the instructions on behalf of the guest operating system 106. Software steps permitting indirect interaction between the guest operating system 106 and the physical hardware platform 114 can also be performed by the virtual hypervisor 110.

When operating in a virtualized environment, the virtual machines 104 present a virtualized environment to the guest operating systems 106, which in turn provide an operating environment for applications 108 and other software constructs.

Applications 108 that are implemented on the virtual machines 104 may be configured to access one or more data sources in accordance with the functions thereof. As discussed herein by way of example, a data source may be a file, however, the disclosure is not so limited. For example, database applications and/or applications that operate, at least in part, using data sources such as database files, may rely on access to one or more database files to perform the requisite operations. In some embodiments, such access may further include one or more settings that determine or identify a portion, format, location, path, version or other attribute of the file being accessed. For example, an access request corresponding to a database file may include query terms, among others. In some embodiments, an access request corresponding to a database file may be directed to a database 120 that may be included in or provided in addition to the data storage space 116.

In some embodiments, a dynamic message generator 130 may generate a dynamic message that corresponds to a service request that directed to a service (e.g., an application) that is connected to a software bus 132. The dynamic message may include executable code that may be executed by the application to perform an action. In some embodiments, the action may include retrieving data corresponding to a data source that may provide data values that are available and/or substantially contemporaneous with the execution of the executable code. In this manner, the dynamic message may be able to cause the application to perform based on recent data versus data that represents a snapshot taken at the time the dynamic message was submitted to the software bus 132.

Although illustrated as a stand-alone functional block, the dynamic message generator 130 may be a module, function, feature and/or service included in and/or integrated with a service that generates a message requesting a service via the software bus 132.

Figure 3:
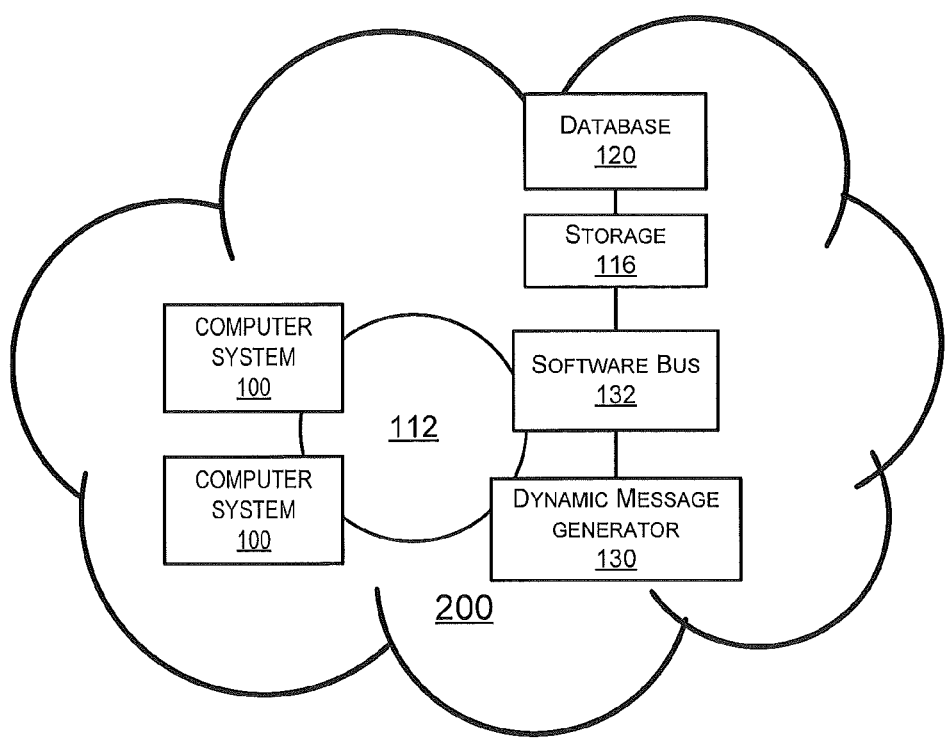
FIG. 3 illustrates a virtual computing environment according to some embodiments of the present inventive subject matter.

Reference is now made to FIG. 3, which illustrates a virtual computing environment according to some embodiments of the present inventive subject matter. A virtual computing environment 200 (referred to generally as cloud 200) may include one or more computer systems 100 (referred to as server systems) that may include one or more electronic computing devices operable to receive, transmit, process, and store data. For example, the servers in the cloud 200 may include one or more general-purpose personal computers, workstations, server computers, server pools, or any other suitable devices. In certain embodiments, the cloud 200 may include a web server. In short, the cloud 200 may include any suitable combination of software, firmware, and hardware.

The plurality of server systems 100 may be communicatively coupled via a network 112. The network 112 facilitates wireless and/or wireline communication, and may communicate using, for example, IP packets, Frame Relay frames, Asynchronous Transfer Mode (ATM) cells, voice, video, data, and other suitable information between network addresses. The network 112 may include one or more local area networks (LANs), radio access networks (RANs), metropolitan area networks (MANs), wide area networks (WANs), all or a portion of the global computer network known as the Internet, and/or any other communication system or systems at one or more locations. Although referred to herein as "server systems", it will be appreciated that any suitable computing device may be used. A network address may include an alphabetic and/or numerical label assigned to a device in a network. For example, a network address may include an IP address, an IPX address, a network layer address, a MAC address, an X.25/X.21 address, and/or a mount point in a distributed file system, among others.

While FIG. 3 illustrates a physical configuration of servers within a cloud 200, a computer system 100 may include a logical grouping of virtual machines 104 within a virtualization environment in the cloud 200. Although not illustrated herein, the virtual machines 104 in the cloud can be organized and managed in clusters, which may also referred to herein as "grids". A virtualization environment in the cloud 200 may be managed by a single hypervisor 110, or a set of hypervisors 110.

Virtual machines can be deployed in particular virtualization environments and organized to increase the efficiency of operating and/or managing a virtual computing environment. For example, virtual machines may be grouped into clusters in order to provide load balancing across multiple servers.

A dynamic message generator 130 as discussed above regarding FIG. 2 may generate a dynamic message that corresponds to a service request that directed to a service (i.e., an application) that's connected to a software bus 132. The dynamic message generator 130 and/or the software bus 132 may be included in and/or provided by one or more of the virtual machines 104 in the cloud 200.

Figure 4:
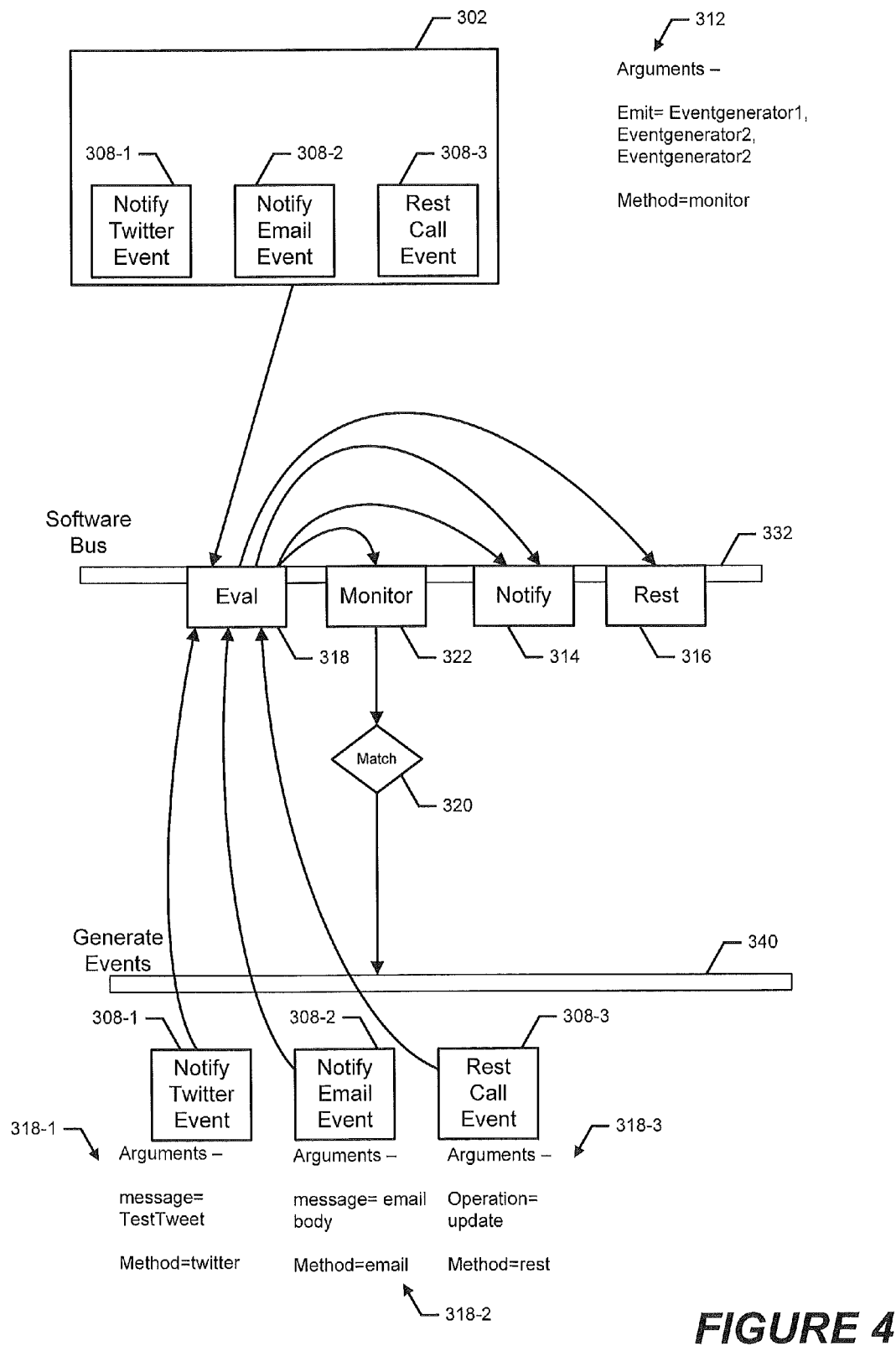
FIG. 4 is a block diagram illustrating an example of a dynamic event that generates multiple other events and types of events according some embodiments of the present inventive subject matter.

Reference is now made to FIG. 4, which is a block diagram illustrating an example of a dynamic event that generates multiple other events and types of events according some embodiments of the present inventive subject matter. By way of example, an event object 302 is submitted to a software bus 332. The arguments 312 corresponding to the event object 302 may include three event generator executable code portions and a method identifying the function monitor. The events to be generated by the executable code may include a notify Twitter event 308-1, a notify email event 308-2 and a rest call event 308-3.

At the software bus 332, the eval service 318 evaluates the arguments 312 corresponding to the event object 302, which causes the executable code in the event object to be monitored by the monitor service 322 to determine a match 320 between the functions in the argument 312 and conditions in the system. Stated differently, the executable portion of the arguments 312 in the event object 302 may be unexecuted until execution becomes possible and/or until conditions specified therein are met. Events 308 corresponding to the executable portion of the arguments 312 may be generated 340. Once the events 308 are generated, they may be evaluated in the eval service 318 for subsequent processing or operations. For example, the notify Twitter event 308-1 may be evaluated as a notify event and thus routed to a notify service 314. The notify Twitter event arguments 318-1 may include the contents of the message ("TestTweet") and indicate the method through which the notification should be performed (i.e., Twitter).

Similarly the notify email event 308-2 may be evaluated as a notify event and thus also routed to the notify service 314. The notify email event arguments 318-2 may include the message contents as well as the method through which the notification should be performed (i.e., email). The Rest call event 308-3 may be evaluated as a Rest event and thus routed to a Rest service 316. The rest call event arguments 318-3 may provide that the operation is an update operation and that the method is Rest. In this manner, the executable portion of the original event object 302 may provide dynamic data and dynamic actions via the software bus 332.

Figure 5:
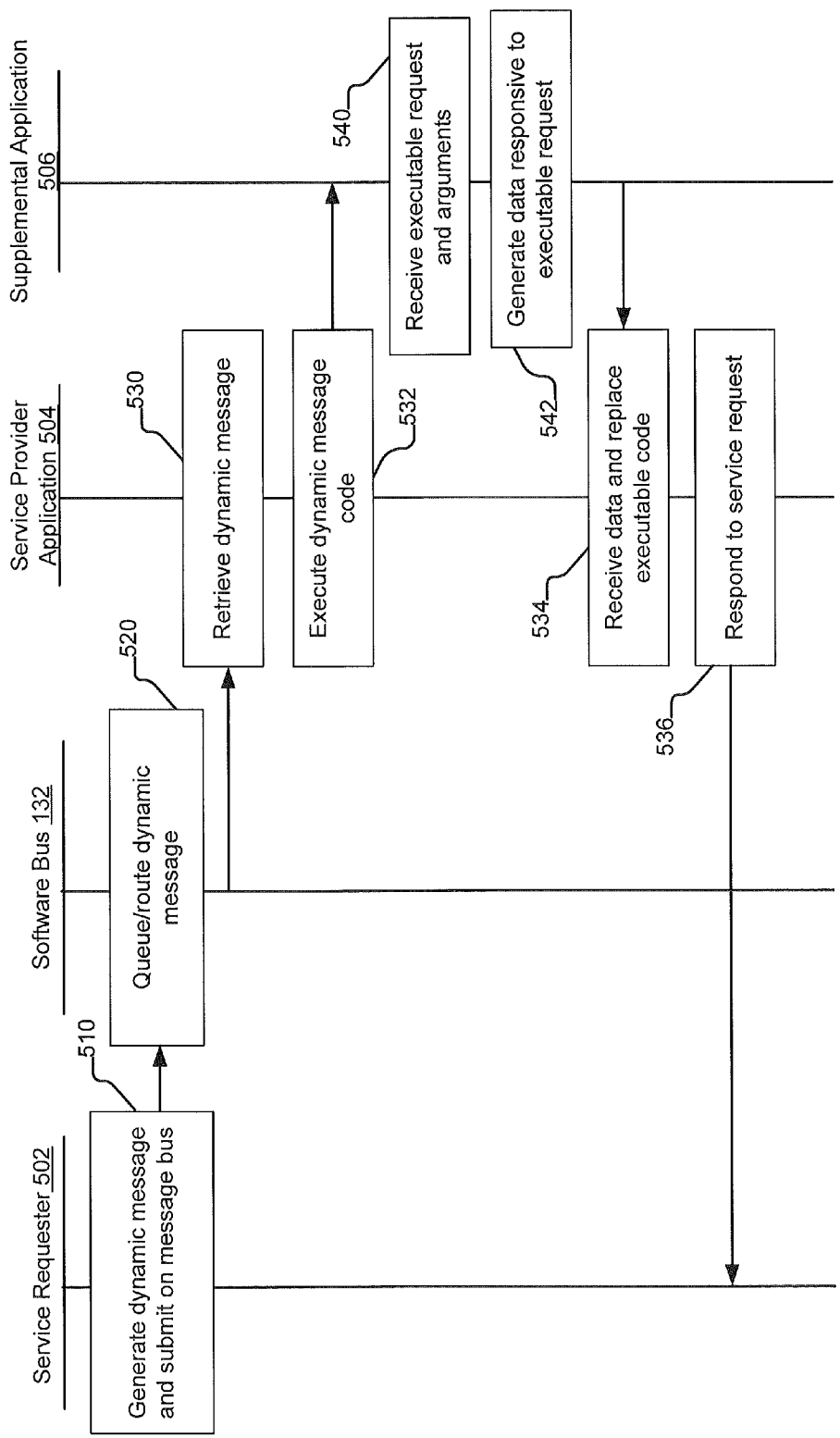
FIG. 5 is a block diagram illustrating operations corresponding to some embodiments of the present inventive subject matter.

Reference is now made to FIG. 5, which is a block diagram illustrating operations corresponding to some embodiments of the present inventive subject matter. A service requester 502 may generate a dynamic message that includes an executable portion may be executed to perform an action and cause the dynamic message to be submitted to a software bus 132 (block 510). As used herein, a service requester 502 may include any computer program and/or application which may provide or request service via a software bus including a message bus, a service bus, an event bus and/or an ESB among others. The software bus 132 may perform various operations corresponding to receiving the dynamic message including queuing and routing the dynamic message (block 520). For example, the software bus 132 may route the dynamic message to a service provider application 504. As used herein, a service provider application 504 may include any computer program and/or application which may provide or request service via a software bus including a message bus, a service bus, an event bus and/or an ESB among others.

In some embodiments, the service provider application 504 may retrieve the dynamic message from the software bus 132 (block 530). In some embodiments, the dynamic message may be pushed to the service provider application 504 via the software bus 132. Some embodiments provide that the dynamic message may include an executable portion that includes executable code that may be written in a dynamic programming language. The service provider application 504 may execute dynamic message code contained in the dynamic message (block 532). In some embodiments, the executable portion in the dynamic message may include instructions to execute a request via a supplemental application 506. As used herein, a supplemental application 506 may include any computer program and/or application which may provide or request service via a software bus including a message bus, a service bus, an event bus and/or an ESB among others. While the service provider application 504 may not be generally configured to access or even include an awareness or capacity regarding the supplemental application 506, the executable portion of the dynamic message may include functionality to execute the supplemental application 506.

The supplemental application 506 may receive an executable request and/or arguments corresponding to the executed dynamic message code (block 540). The supplemental application 506 may generate data responsive to the executable request which may, in the current example, be returned to the service provider application 504 (block 542). In this manner, dynamic data may be provided to the service provider application 504. In some embodiments the dynamic data acquired via the supplemental application 506 may merely be reported, however, in other embodiments the dynamic data may be used as an input for other functions in the service provider application 504.

The service provider application 504 may receive data from the supplemental application 506 (block 534). In some embodiments, the dynamic data received from the supplemental application 506 may be used to replace the executable code in the original dynamic message. For example, the original dynamic message may request a service corresponding to data provided via the supplemental application 506. In the case of the current example, the data received from the supplemental application may be contemporaneous to when the service provider application 504 executed the portion of the dynamic message instead of when the message was submitted to the software bus 132. In this regard, any delays in processing the message may not adversely impact the quality, accuracy and/or veracity of the data. The service provider application 504 may use the data that was recently generated by the supplemental application 506 and respond to the service request (block 536).

Figure 6:
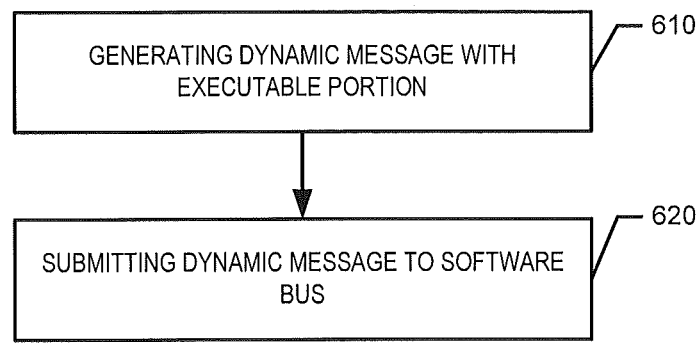
FIG. 6 is a flowchart illustrating operations for systems/methods according to some embodiments of the present inventive subject matter.

Reference is now made to FIG. 6, which is a flowchart illustrating operations for systems/methods according to some embodiments of the present inventive subject matter. Methods herein may include generating a dynamic message with an executable portion (block 610). Some embodiments provide that the dynamic message corresponds to a service request from an application that is connected to a software bus. The executable portion may be executed to perform one or more actions. In some embodiments, the executable portion includes a dynamic computer programming language that is compiled as human readable source code. Examples of such languages include Java Script, Scheme and Lisp, among others. Dynamic programming languages may be distinguished from static programming languages, such as Java and C, which may be compiled and error checked before any execution may be performed. The dynamic message may be submitted to the software bus (block 620).

In some embodiments, the executable portion is executed by the application. As used herein, an application may include one or more computer programs that may provide one or more services to one or more other application, programs or services that communicate with the software bus. Some embodiments provide that the application may perform the action substantially after the dynamic message is submitted to the software bus. For example, the dynamic message may be submitted to the software bus at a first point in time and the application may access the dynamic message at a later time. In this regard, data may be retrieved via at a time that is substantially after the dynamic message is submitted to the software bus.

Some embodiments provide that the (first) application causes, by virtue of the dynamic message, the executable portion to be executed by another (second) application via the software bus. For example, the executable portion may include dynamic computer program code that directs retrieval of data from the other second application the first application via the software bus. In some embodiments, second application does not exist when the first application is connected to the software bus. In some embodiments, the dynamic computer program code includes input data for the second application that causes the second application to provide output data responsive to the input data. The first application may replace the executable portion in the dynamic message with the output data from the second application.

In some example embodiments, the dynamic message is a first event object and the software bus is an event bus. The first event object may be evaluated on the event bus to generate a second event object and a third event object responsive to the executable portion of the dynamic message. The second event object may be evaluated to cause a first notify action and the third event may be evaluated to cause a second notify action that is different from the first notify action.

Some embodiments provide that the executable portion causes data that is generated after the dynamic message is submitted to the software bus to be retrieved. The retrieved data may replace the executable portion of the dynamic message for evaluation by the application.

Server automation/provisioning tools (also referred to as server deployment tools) may be used to manage virtual machines in a cloud computing environment. For example, server automation/provisioning tools may move virtual machines from one hypervisor to another or from one virtualization environment to the other. These tools may also be used, for example, to deploy, provision, activate, suspend, and otherwise manage the operation of virtual machines. These tools may further be used to implement systems/methods according to some embodiments described herein.

The flowchart and block diagrams in the figures illustrate the architecture, functionality, and operation of possible implementations of systems, methods and computer program products according to various aspects of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular aspects only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of any means or step plus function elements in the claims below are intended to include any disclosed structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The aspects of the disclosure herein were chosen and described in order to best explain the principles of the disclosure and the practical application, and to enable others of ordinary skill in the art to understand the disclosure with various modifications as are suited to the particular use contemplated.

What is claimed is:

1. A method comprising:
   generating a dynamic message that corresponds to a service request from an application that is connected to a software bus that provides interaction and communication between a plurality of applications that include the application in a service oriented architecture, the dynamic message comprising an executable portion that is executed to perform an action,
   wherein the application comprises a first service, and the executable portion comprises dynamic computer program code that comprises input data for a second service, that causes the second service to provide output data responsive to the input data,
   wherein the dynamic message comprises a first event object and the software bus comprises an event bus, and
   wherein the first event object is evaluated on the event bus to generate a second event object and a third event object responsive to the executable portion, wherein the second event object is evaluated to cause a first notify action and the third event is evaluated to cause a second notify action that is different from the first notify action.

2. The method according to claim 1, further comprising submitting the dynamic message to the software bus,
   wherein the executable portion is executed by the application and performs the action after the dynamic message is submitted to the software bus.

3. The method according to claim 1, further comprising submitting the dynamic message to the software bus,
   wherein the application comprises a first application, and
   wherein the first application causes the executable portion to be executed by a second application that is different from the first application.

4. The method according to claim 1,
   wherein the application comprises a first application,
   wherein the dynamic message is submitted to the software bus at a first time,
   wherein the first application accesses the dynamic message at a second time that is after the first time, and
   wherein the action comprises retrieving data via a second application that is different from the first application.

5. The method according to claim 4, wherein the data comprises a first data value at the first time and a second data value that is different from the first data value at the second time.

6. The method according to claim 1, wherein the executable portion comprises a dynamic computer programming language that is compiled as human readable source code.

7. The method according to claim 1, wherein the executable portion comprises computer program code that retrieves data that is generated after the dynamic message is submitted to the software bus.

8. The method according to claim 7, wherein the data that is generated after the dynamic message is submitted to the bus replaces the executable portion of the dynamic message for evaluation by the application.

9. The method according to claim 1, wherein the executable portion comprises computer program code that retrieves data that is generated contemporaneous to when the data is retrieved.

10. The method according to claim 1, wherein the executable portion comprises dynamic computer program code that directs retrieval of data from the second service to the first service via the software bus.

11. The method according to claim 10, wherein the second service does not exist when the first service is connected to the software bus.

12. The method according to claim 1, wherein the input data for the second service further causes the second service to replace the executable portion with the output data from the second service.

13. The method according to claim 1,
wherein the dynamic message is submitted to the software bus at a first time,
wherein the first application accesses the dynamic message at a second time that is after the first time,
wherein the action comprises retrieving data via the second application that is different from the first application, and
wherein the data comprises a first data value at the first time and a second data value at the second time, the first data value being different that the second data value.

14. The method according to claim 1, wherein the executable portion of the dynamic message remains unexecuted until specified conditions are met.

15. A computer program product comprising:
a non-transitory computer readable storage medium having computer readable program code embodied in the medium, the computer code comprising:
computer readable code to generate a dynamic message that corresponds to a service request from an application that is connected to a software bus that provides interaction and communication between a plurality of applications that include the application in a service oriented architecture, the dynamic message comprising an executable portion that is executed to perform an action and that comprises a dynamic computer programming language; and
computer readable code to submit the dynamic message to the software bus,
wherein the application comprises a first application, and wherein the first application causes the executable portion to be executed by a second application that is different from the first application,
wherein the executable portion comprises computer program code that retrieves data that is generated after the dynamic message is submitted to the software bus, and
wherein the data that is generated after the dynamic message is submitted to the bus replaces the executable portion of the dynamic message for evaluation by the application.

16. The computer program product according to claim 15, wherein the executable portion of the dynamic message is executed by the application and performs the action after the dynamic message is submitted to the software bus.

17. The computer program product according to claim 15,
wherein the dynamic message is submitted to the software bus at a first time,
wherein the first application accesses the dynamic message at a second time that is after the first time, and
wherein the action comprises retrieving data via a second application that is different from the first application.

18. The computer program product according to claim 17, wherein
the data comprises a first data value at the first time and a second data value that is different from the first data value at the second time.

19. A computer system, comprising:
a processor; and
a memory coupled to the processor, the memory comprising computer readable program code embodied therein that, when executed by the processor, causes the processor to:
generate a dynamic message that corresponds to a service request from an application that is connected to a software bus that provides interaction and communication between a plurality of applications that include the application in a service oriented architecture, the dynamic message comprising an executable portion that is executed to perform an action and that comprises a dynamic computer programming language; and
submit the dynamic message to the software bus,
wherein the application comprises a first service, and the executable portion comprises dynamic computer program code that directs retrieval of data from a second service to the first service via the software bus, and
wherein the second service does not exist when the first service is connected to the software bus.

20. The computer system according to claim 19, wherein the executable portion comprises dynamic computer program code that comprises input data for the second service, that causes the second service to provide output data responsive to the input data, and that replaces the executable portion with the output data from the second service.

21. The computer system according to claim 19,
wherein the executable portion is executed by the application and performs the action after the dynamic message is submitted to the software bus.

22. The computer system according to claim 19,
wherein the application comprises a first application, and wherein the first application causes the executable portion to be executed by a second application that is different from the first application.

* * * * *